UNITED STATES PATENT OFFICE.

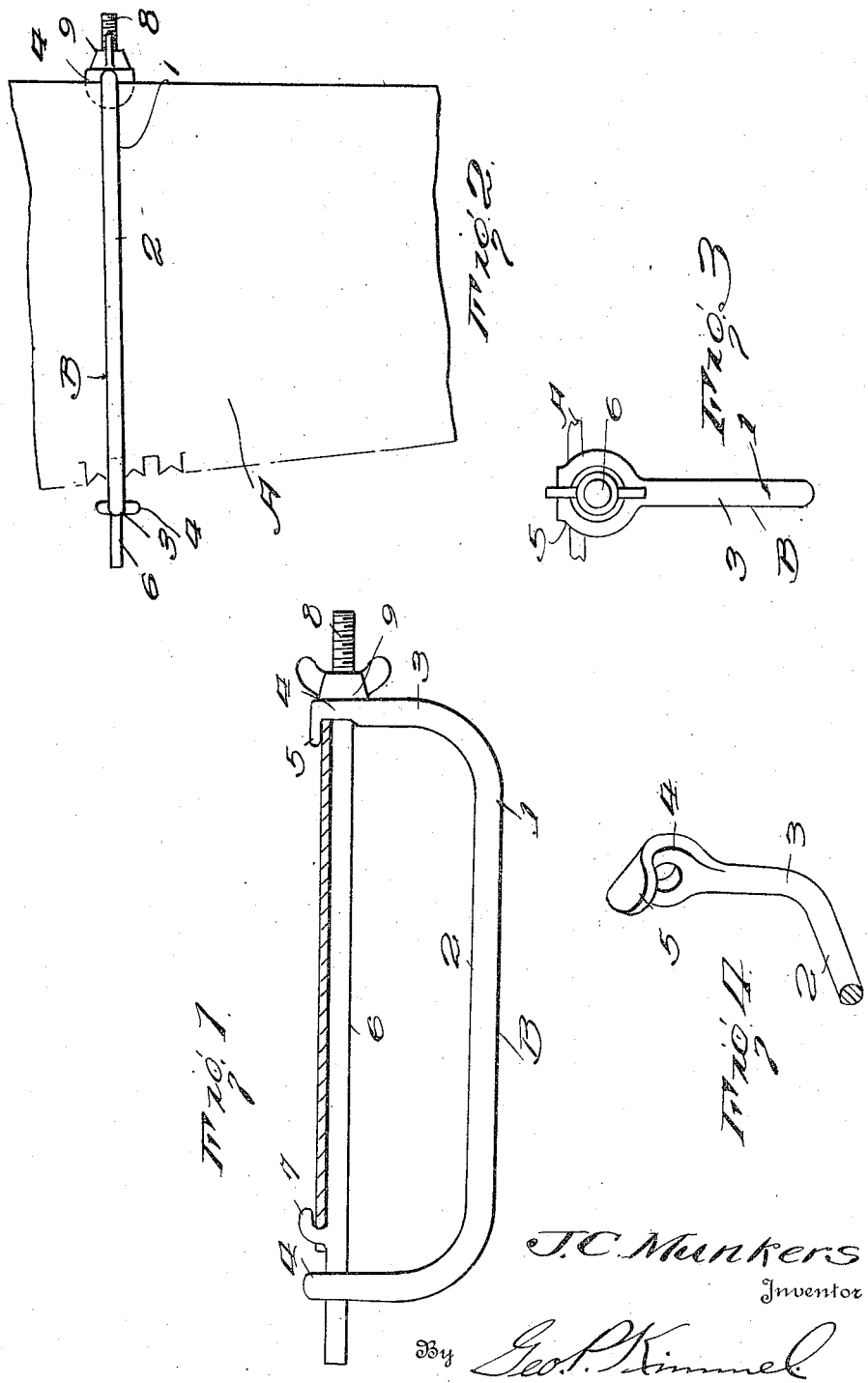

JAMES C. MUNKERS, OF FALLS CITY, OREGON.

SAW-CARRYING DEVICE.

1,305,831.   Specification of Letters Patent.   Patented June 3, 1919.

Application filed January 11, 1919. Serial No. 270,759.

*To all whom it may concern:*

Be it known that I, JAMES C. MUNKERS, a citizen of the United States, residing at Falls City, in the county of Polk and State of Oregon, have invented certain new and useful Improvements in Saw-Carrying Devices, of which the following is a specification.

The present invention comprehends generally improvements in article carriers and more particularly relates to a saw carrying device.

It is a well known fact that serious difficulty is occasioned especially by lumbermen in carrying the long crosscut saws to and from the woods, it being customary at present to place the saw over the shoulder and grasp one of the straight edges of the saw blade with the hand, but this method is dangerous and inconvenient. It is therefore the primary aim and object of this invention to provide a device designed to be attached to the saw blade and grasped by the hand to facilitate the carrying of the saw blade, the majority of the weight of which is disposed on the shoulder of the carrier.

More particularly, the present invention contemplates the provision of a device of the above mentioned character embodying a grip while formed therewith is a rigid jaw while adjustably associated with the grip is a saw blade engaging bar or rod which also carries a rigid jaw for coacting with the other jaw and engaging the opposite edges of the saw blade, while acting in conjunction with one threaded extremity of the bar or rod is means for clamping the parts in engagement with the saw blade.

Among the other aims and objects of this invention may be recited the provision of a device of the above mentioned character wherein the number of parts are comparatively few, the construction simple, the cost of production low and the efficiency high.

Other objects, as well as the nature, characteristic features and scope of the invention will be more readily apparent from the following description taken in connection with the accompanying drawings and pointed out in the claims, forming a part of this specification.

The invention is clearly illustrated in the accompanying drawings, in which:—

Figure 1 is a transverse sectional view through a saw blade showing the device attached to the blade, Fig. 2 is a plan view looking toward the under face of the saw when the latter is in carrying position, showing the device attached to the blade, Fig. 3 is an end elevational detail of the device, and Fig. 4 is a perspective detail of a portion of the grip showing the rigid jaw thereon.

Similar characters of reference are employed in all of the above described views, to indicate corresponding parts.

Referring now, more particularly, to the accompanying drawings there is illustrated a saw blade A, only a portion of which is shown while detachably connected to the blade transversely thereof is the improved saw carrying device indicated generally by the letter B.

In the present instance, the improved saw carrying device may be said to consist of a U-shaped frame generally designated 1, forming a grip and consisting of an intermediate portion 2 and spaced parallel side arms 3, terminating in loops 4 on one terminal loop of which is formed an inwardly extending rigid saw blade clamping jaw 5. A saw blade engaging rod 6 is slidably and removably mounted in the loop terminal 4 and is formed near one end with another rigid jaw 7 positioned inwardly of the loop opposite the jaw 5 and this jaw 7 is designed to be engaged about the edge of the saw blade A opposite the edge about which the jaw 5 is engaged, the sliding of the rod 6 permitting of the engagement of these jaws 5 and 7 about the saw blades of various widths. The portion of the rod disposed through and projecting beyond the loop 4 upon which the jaw 5 is formed, is threaded as at 8 and receives a clamping element such as a wing nut 9 which when adjusted on the threaded portion 8 bears against the rear face of the adjacent loop terminals 4 and draws the rod 6 as well as the jaw 7 into clamping relation with the adjacent edge of the saw blade A opposite to the edge engaged by the jaw 5. Of course by the peculiar construction and arrangement of parts it is apparent that at any time the wing nut may be loosened so that the rod may be slid to in consequence disengage the jaw 7 from the saw blade.

In use, the device is attached transversely of the under surface of the saw blade A in the manner shown in the drawings and is desirably positioned near one end of the saw blade facilitating the carrying of the saw blade by a lumberman obviating the necessity of grasping the saw blade directly with the hand when the blade is in a carrying position over the shoulder of the lumberman. It is of course apparent that the majority of the weight of the blade is disposed on the shoulder but the grip serves as a balancing and steadying means while the saw is being carried.

It is believed in view of the foregoing description that a further detailed description of the operation of the invention is entirely unnecessary. Likewise, it is believed that the advantages of the invention will be readily apparent.

Still further embodiments of the invention than those herein especially defined may be resorted to as conditions or preference may dictate without departing from the spirit of the invention.

Having thus fully described the invention, what is claimed as new, and desired to be secured by Letters Patent, is:—

1. A saw carrying device including a U-shaped frame forming a grip consisting of an intermediate portion, spaced side arms terminating in loops, a rigid jaw formed on the looped terminal of one of the side arms, a saw engaging rod slidably mounted in the loop terminals of the arms, a rigid jaw on the rod for coacting with the other rigid jaw, and clamping means engageable with the rod and coacting with the grip for releasably maintaining the jaws in clamping relation.

2. A saw carrying device comprising a frame of U-shaped configuration forming a grip, the same including an intermediate portion, spaced side arms and loops at the ends of the side arms, a rigid jaw extending inwardly from one of the loops, a saw engaging rod slidably mounted in the loop, a rigid jaw on the rod near one end thereof and positioned inwardly of the loop opposite the one upon which the first mentioned rigid jaw is formed so that both rigid jaws will coact with each other, the opposite projecting end portion of the rod being threaded, and a wing nut adjustably engaged with the threaded portion of the rod and bearing against the adjacent loop for releasably maintaining the jaws in clamping relation.

In testimony whereof, I affix my signature hereto.

JAMES C. MUNKERS.

Copies of this patent may be obtained for five cents each, by addressing the "Commissioner of Patents, Washington, D. C."